US011960483B1

United States Patent
Chhabra et al.

(10) Patent No.: US 11,960,483 B1
(45) Date of Patent: Apr. 16, 2024

(54) CONSTANT TIME DATA STRUCTURE FOR SINGLE AND DISTRIBUTED NETWORKS

(71) Applicant: Wells Fargo Bank, N.A., San Francisco, CA (US)

(72) Inventors: Gaurav Chhabra, Hyderabad (IN); Anil Kumar Omkar, Hyderabad (IN); Shreeya Sengupta, Ranchi (IN); Gaurav Wadhwa, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 92 days.

(21) Appl. No.: 17/477,273

(22) Filed: Sep. 16, 2021

(51) Int. Cl.
  *G06F 16/00* (2019.01)
  *G06F 16/2453* (2019.01)
  *G06F 16/2458* (2019.01)
  *G06F 16/27* (2019.01)
  *H04L 9/08* (2006.01)

(52) U.S. Cl.
  CPC .... *G06F 16/24542* (2019.01); *G06F 16/2465* (2019.01); *G06F 16/27* (2019.01); *H04L 9/0819* (2013.01)

(58) Field of Classification Search
  CPC .......... G06F 16/24542; G06F 16/2465; G06F 16/27; H04L 9/0819
  See application file for complete search history.

(56) References Cited

U.S. PATENT DOCUMENTS

| | | | |
|---|---|---|---|
| 8,224,829 B2 | 7/2012 | Pauly | |
| 8,386,717 B1 | 2/2013 | Banerjee et al. | |
| 8,510,499 B1 | 8/2013 | Banerjee | |
| 8,676,855 B2 | 3/2014 | Ushiyama | |
| 9,066,289 B2 | 6/2015 | Katayama et al. | |
| 9,667,704 B1* | 5/2017 | Sonawane | H04L 67/63 |
| 9,846,642 B2 | 12/2017 | Choi et al. | |
| 10,171,104 B1* | 1/2019 | Lee | H03M 7/425 |
| 10,725,989 B2 | 7/2020 | Schiffmann et al. | |
| 11,194,506 B1* | 12/2021 | Proulx | G06F 3/0604 |

(Continued)

FOREIGN PATENT DOCUMENTS

| | | |
|---|---|---|
| CN | 102916891 A * | 2/2013 |
| CN | 104486387 A | 4/2015 |

(Continued)

OTHER PUBLICATIONS

Askitis et al., "Redesigning the String Hash Table, Burst Trie, and BST to Exploit Cache", ACM J. Exp. Algor., vol. 15, No. 1, Article 1.7 (Jan. 2011), 61 pages.

(Continued)

*Primary Examiner* — Alexander Khong
(74) *Attorney, Agent, or Firm* — Merchant & Gould P.C.

(57) ABSTRACT

A data structure is specialized in efficiently representing a key-value pair in a highly optimized way. The data structure is a pointer in a traversal graph that takes advantage of constant time traversal for all operations. The data structure has specific instructions for inserting data nodes, router nodes, and how the expansion or collapse of the graph works. The data structure can be applied where the time to get the result back is most prominent. The data structure can be used to reduce the memory footprint to reach the data that is being searched and achieve a worst-case time complexity in constant time.

20 Claims, 15 Drawing Sheets

(56) References Cited

U.S. PATENT DOCUMENTS

| | | | |
|---|---|---|---|
| 2005/0071720 A1* | 3/2005 | Dattaram Kadkade | G06F 30/3323 714/741 |
| 2015/0309992 A1* | 10/2015 | Visel | G06F 40/30 704/9 |
| 2015/0381550 A1* | 12/2015 | Mohammed | G06Q 50/01 709/206 |
| 2016/0080340 A1* | 3/2016 | Oba | H04L 9/0891 713/176 |
| 2017/0041861 A1* | 2/2017 | Fuhrmann | H04W 84/18 |
| 2018/0349374 A1 | 12/2018 | Gurajada et al. | |
| 2020/0133942 A1 | 4/2020 | Barve et al. | |

FOREIGN PATENT DOCUMENTS

| | | | |
|---|---|---|---|
| EP | 1016988 A2 * | 7/2000 | G06F 17/30575 |
| KR | 1512716 B1 | 4/2015 | |
| TW | 202107370 A * | 2/2021 | G06F 16/2219 |
| WO | WO-2002044940 A2 * | 11/2001 | |
| WO | 03103242 A3 | 4/2004 | |
| WO | 2005031576 A2 | 4/2005 | |
| WO | 2009151310 A1 | 12/2009 | |
| WO | 2018064962 A1 | 4/2018 | |

OTHER PUBLICATIONS

Heinz et al., "Burst Tries: a Fast, Efficient Data Structure for String Keys", ACM Transactions on Information Systems, vol. 2, Issue 2, Apr. 2002, 31 pages.

Rowstron et al., "Pastry: Scalable, decentralized object location and routing for large-scale peer-to-peer systems", Proc. of the 18th IFIP/ACM International Conference on Distributed Systems Platforms, Nov. 2001, 22 pages.

Sheela et al., "Survey on Data Mining Techniques with Data Structures", Proceedings of the International Conference on Soft Computing Systems. Advances in Intelligent Systems and Computing, vol. 398, Dec. 2016, 13 pages.

Spiegel, Daniel S., "Analysis of Algorithms", http://faculty.kutztown.edu/spiegel/CSc237/PowerPoint/AnalysisOfAlgs.pptx, Oct. 2019, 73 pages.

* cited by examiner

Figure 9A

```
PROCEDURE INSERT (KEY, VALUE)
   BEGIN
        VAR HEX = GENERATE_HEX (KEY)
        VAR NODE = ROUTE_NODE (HEX, PARENT_NODE)
        NODE.VALUE = VALUE
   END
```

Figure 9B

```
PROCEDURE STRING GENERATE_HEX (KEY)
   BEGIN
        VAR B_NUM [] = CONVERT KEY INTO BINARY FORMAT OF 128 BITS
        INDEX = 4
        HEX_STRING = ""
        LOOP THROUGH B_NUM
                VAR F_GRP = GROUP EVERY FOUR BITS
                VAR HEX = CONVERT_TO_HEX (F_GRP)
                HEX_STRING = HEX_STRING + HEX
                INDEX = INDEX + 4
        END LOOP
        RETURN HEX_STRING
   END
```

Figure 9C

```
PROCEDURE NODE ROUTE_NODE (HEX, PARENT_NODE)
  BEGIN
        HEX_DIGIT [] = SPLIT HEX
        VAR INDEX=0
        VAR CURR_NODE = PARENT_NODE
        VAR PREV_NODE = PARENT_NODE
        LOOP INDEX < HEX_DIGIT.LENGTH
            PREV_NODE = CURR_NODE
            CURR_NODE = PREV_NODE [HEX_DIGIT [INDEX]]
            IF CURR_NODE == NULL THEN
                IF IS_EXPANDABLE (PREV_NODE, JOIN (HEX_DIGIT, INDEX, LENGTH))
                        CURR_NODE = EXPAND (PREV_NODE, JOIN (HEX_DIGIT, INDEX, LENGTH))
                ELSE
                        CURR_NODE = CREATE_NODE (PREV_NODE, JOIN (HEX_DIGIT, INDEX, LENGTH))
                RETURN CURR_NODE
                END IF
            END IF
            INCREMENT INDEX
        END LOOP
  END
```

Figure 9D

```
PROCEDURE NODE FIND_NODE (KEY, PARENT_NODE)
   BEGIN
        VAR HEX = GENERATE_HEX (KEY)
        HEX_DIGIT [] = SPLIT HEX
        VAR INDEX=0
        VAR CURR_NODE = PARENT_NODE
        LOOP INDEX < HEX_DIGIT.LENGTH
            CURR_NODE = CURR_NODE [HEX_DIGIT [INDEX]]
            IF CURR_NODE == NULL THEN
                VAR HEX = JOIN HEX_DIGIT FROM INDEX TO HEX_DIGIT.LENGTH
                CURR_NODE = CURR_NODE [HEX]
                IF CURR_NODE == NULL
                    RETURN NULL
                END IF
            END IF
            INCREMENT INDEX
        END LOOP
        RETURN CURR_NODE
   END
```

Figure 9E

```
PROCEDURE DELETE (KEY)
   BEGIN
        VAR NODE = FIND_NODE (KEY, ROOT_NODE)
        IF NODE != NULL
            VAR PARENT_NODE = NODE.PARENT
            NODE.DELETE;
            COLLAPSE (PARENT_NODE)

END IF
   END
```

Figure 9F

```
PROCEDURE EXPAND (CURR_NODE, NEW_HEX_DIGIT)
   BEGIN
         LOOP CURR_NODE.NODES AS CHILD_NODE
            VAR FIRST_DIGIT =
CHILD_NODE.HEX_DIGIT.AT_INDEX [0]
            VAR CHILD_DIGIT =
CHILD_NODE.HEX_DIGIT.SUBSTR (1, LENGTH)
            IF FIRST_DIGIT == NEW_HEX_DIGIT
                  CHILD_NODE.HEX_DIGIT = FIRST_DIGIT
                  VAR NEW_NODE = CREATE_NODE
(CHILD_NODE, CHILD_DIGIT)
                  CHILD_NODE [CHILD_DIGIT] = NEW_NODE
                  NEW_NODE.VALUE = CHILD_NODE.VALUE;
            END IF
         END LOOP
         RETURN CURR_NODE [NEW_HEX_DIGIT]
   END
```

Figure 9G

```
PROCEDURE COLLAPSE (NODE)
   BEGIN
          IF NODE.CHILDNODES.LENGTH > 1
                   RETURN
          END IF
          VAR CURR_NODE = NODE;
          VAR PARENT_NODE = NODE.PARENT;
          LOOP PARENT_NODE != NULL
              IF CURR_NODE. CHILDNODES.LENGTH > 1
                   CONTINUE
              ELSE IF CURR_NODE. CHILDNODES.LENGTH == 1
                   PARENT_NODE.HEX_DIGIT =
PARENT_NODE.HEX_DIGIT + CURR_NODE.HEX_DIGIT
                   PARENT_NODE.VALUE =CURR_NODE.VALUE
                   CURR_NODE.DELETE;
              ELSE IF CURR_NODE. CHILDNODES.LENGTH == 0
                   CURR_NODE.DELETE
              END IF
              CURR_NODE = PARENT_NODE;
              PARENT_NODE = PARENT_NODE.PARENT;
          END LOOP
   END
```

US 11,960,483 B1

CONSTANT TIME DATA STRUCTURE FOR SINGLE AND DISTRIBUTED NETWORKS

BACKGROUND

The ease of accessing the internet, the evolution of portable technologies, and the digitation of several services such as e-commerce, e-banking, and the growth of social media platforms have contributed to the generation of a plethora of data. Common data structures such as hash maps, binary trees, and linked lists, etc., which are typically used to store the data, have worst-case time complexities from O(n) to O(log(n)) or O(n/m), resulting in variable worst-case time complexity outputs. When data needs to be efficiently managed in a highly responsive and real-time environment, the user is vulnerable to costly computational usage and high run times due to the architectural nature of the implemented data structure.

SUMMARY

Embodiments of the disclosure are directed to traversing a data structure achieved in a worst-case complexity with a limited number of traversals.

According to aspects of the present disclosure, a system comprises: one or more processors; and non-transitory computer-readable storage encoding instructions which, when executed by the one or more processors, causes the system to: receive a plurality of data that is contained in the data structure to be transversed; insert a node into the data structure with a key and a value; generate a hexadecimal digit based on the key; and route the node to a proper position inside the data structure at various routing levels, wherein the routing levels are limited to, for example, speed up the transversal.

The details of one or more techniques are set forth in the accompanying drawings and the description below. Other features, objects, and advantages of these techniques will be apparent from the description, drawings, and claims.

DESCRIPTION OF THE DRAWINGS

FIG. 9A illustrates an example insertion algorithm.
FIG. 9B illustrates an example building algorithm.
FIG. 9C illustrates an example routing algorithm.
FIG. 9D illustrates an example searching algorithm.
FIG. 9E illustrates an example deletion algorithm.
FIG. 9F illustrates an example expanding algorithm.
FIG. 9G illustrates an example collapsing algorithm.

DETAILED DESCRIPTION

This disclosure relates to data structures configured to allow for inserting, updating, deleting, searching, and analyzing large amounts of data. This can include the data structures being configured to expand and collapse, with managed time and space complexities being met.

The advantages of such data structures can include a constant time complexity that allows elements to be searched within large data space quickly and efficiently, enabling organizations with high volumes of data to benefit from a distributed storage capacity. This can improve the computational operations involved in the data mining process, thereby resulting in effective and efficient data mining algorithms that further save computational resources.

In examples provided herein, a data structure can expand and collapse based on a key-value pair back pressure, thereby providing a worst-case time to search any key in O(32) and providing a worst-case time performance of O(32) for inserting, searching, updating, and deleting. A few non-limiting examples of the type of data being operated on includes e-commerce, stock exchanges, e-banking, social media, etc. The data structure provides a constant time complexity in terms of Big (O) for search, insert, update, and delete operations while being flexible enough to run in a distributed environment while also expanding and shrinking.

Further, the data structures can store data optimally in a distributed manner in multiple nodes or, in a one-non limiting example, a virtual machine using a pastry approach. Pastry is a scalable, distributed objection location and routing substrate for wide-area, peer-to-peer application. Pastry performs application-level routing and object location in a potentially vast overlay network of nodes connected via the internet. It can be used to support a variety of peer-to-peer applications, including global data storage, data sharing, and group communication and naming. This is beneficial for any organization dealing with big data and searching over an ample data space.

Figure 1:
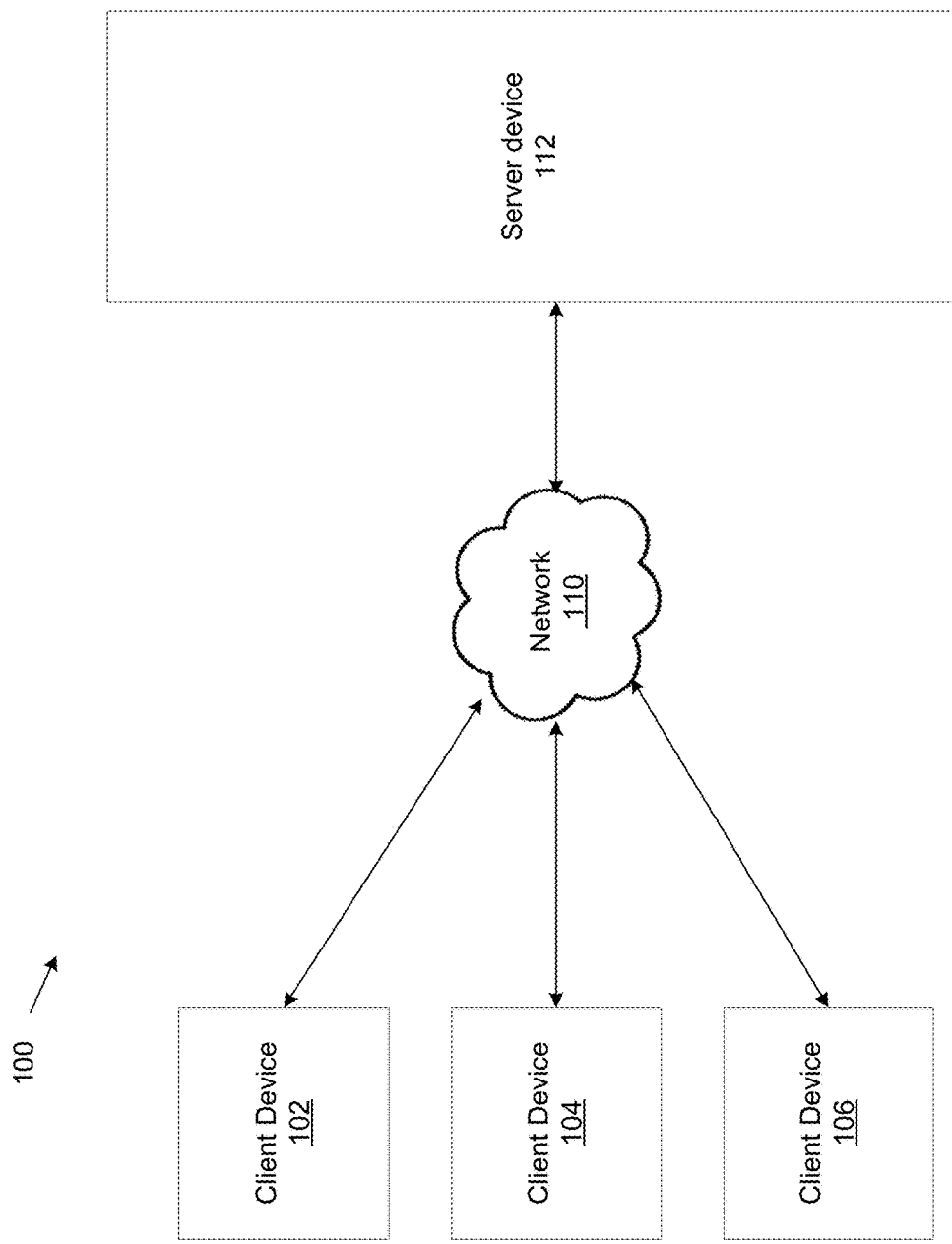
FIG. 1 shows an example system in which aspects of the present disclosure can be implemented.

FIG. 1 schematically shows aspects of an example system 100 of the present disclosure that provides such data structures. The system 100 includes client devices 102, 104, 106, and a server device 112.

The client devices 102, 104, 106 may be one or more computing devices that contain data sources generating and storing various information. For example, client device 102 can include a mobile computer, desktop computer, or other computing device used by a customer to generate or receive data. The client device 102 may capture and upload a wide range of data, including tweets, posts, emails, feedback, reviews, photos, bank transactions, videos, etc.

In one non-limiting example, a client device 102 is used by an individual to generate financial data upon conducting financial transactions with the server device 112, such as deposits and withdrawals among bank accounts.

The client devices 102, 104, 106 can communicate with the server device 112 to transfer data. The server device 112 can also obtain data via other input devices, which can correspond to any electronic data acquisition processes (e.g., through an application programming interface—API). The server device 112 can be connected via a network 110 to the client devices 102, 104, 106 to transport data therebetween.

The server device 112 receives large quantities of data for searching and analyzing from the client devices 102, 104, 106. The server device 112 can be managed by, or otherwise associated with, an enterprise (e.g., a financial institution such as a bank, brokerage firm, mortgage company, or any other money-handling enterprise) that uses the system 100 for data management and/or mining processes. The server device 112 receives data from one or more of the client devices 102, 104, 106.

Figure 2:
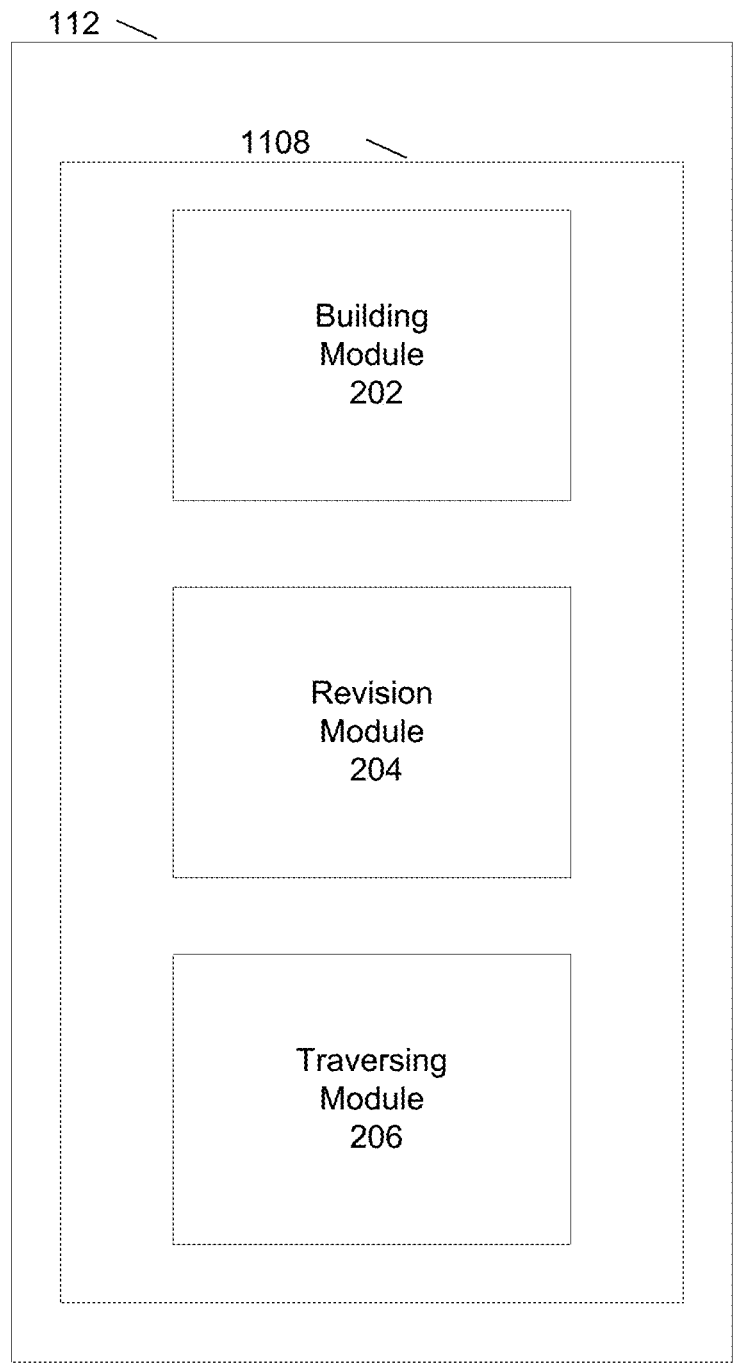
FIG. 2 shows example logical components of a server device of the system of FIG. 1.

FIG. 2 schematically shows aspects of a server device 112 of the system 100. The server device 112 includes an example system memory 1108, building module 202, revision module 204, and traversing module 206.

Within the system memory 1108 is stored the building module 202, revision module 204, and traversing module 206, which provides the contents of the data structures.

The building module 202 is programmed to build the structure analysis schema for data from one or more of the client devices 102, 104, 106. The building module 202 implements a particular way of organizing data so it can be accessed efficiently, depending on the use case. The building module 202 includes the location of the client devices 102, 104, 106 to be imported and related parameters, as well as the name of the data source connection to be used.

The revision module 204 consistently reviews the allocation and managing of the data storage across distributed storage locations, ensuring scalability and performance. The revision module 204 defines the underlying structure of schema to simplify querying.

The traversing module 206 accesses each element of the data structure and performs specific functions over the data. For example, the data structure can be traversed to search for odd or even integers or traversed to find the largest or smallest element in the structure. Additional details of the traversing module 206 are provided below.

Figure 3:
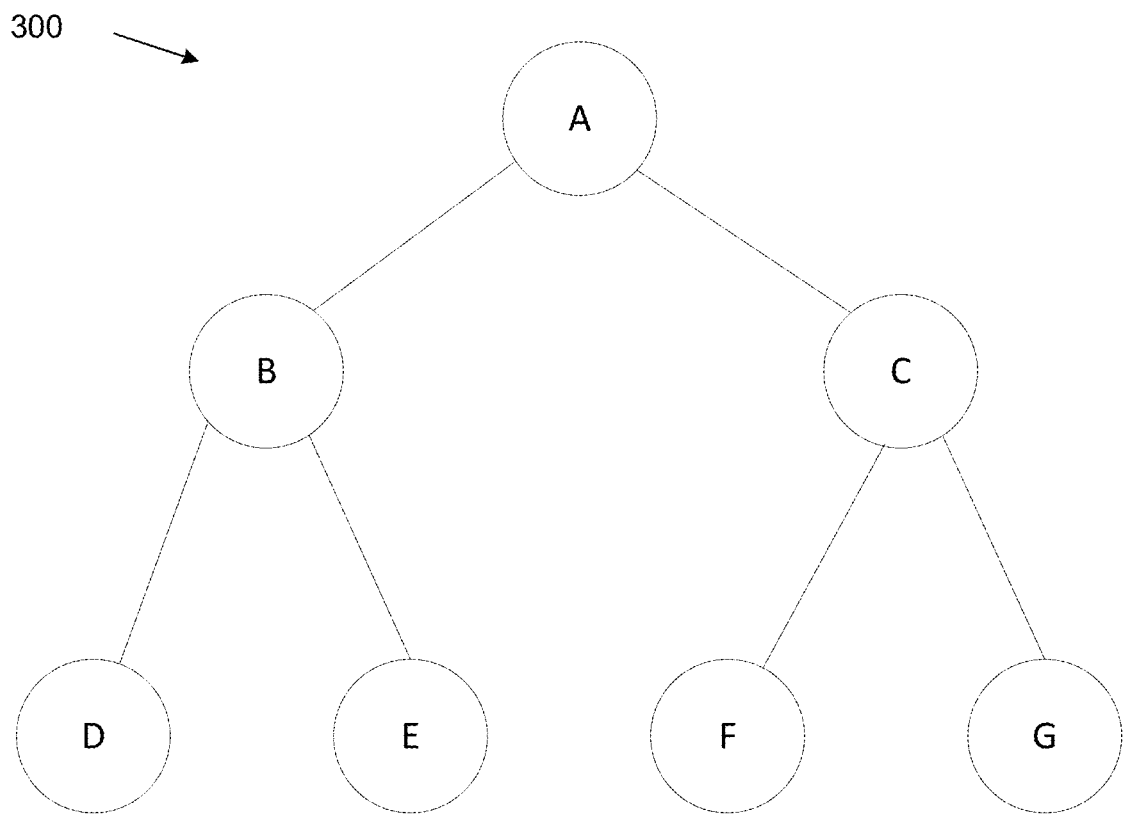
FIG. 3 shows a generic representation of the traversal of nodes in a data structure stored within a system memory of the server device of FIG. 1.

FIG. 3 schematically shows a generic representation of the traversal of nodes in system 300. Traversal is a process to visit all the nodes of a data structure. Because all nodes are connected via edges (i.e., links), the process starts from the root node. As a result, a node cannot be randomly accessed in the data structure.

Typically, there are four ways to traverse a data structure: (1) in-order traversal, (2) pre-order traversal, (3) post-order traversal, and (4) level-order traversal. The first three ways employ depth-first traversals which start at the root node and first visits all nodes of one branch as deep as possible of the chosen Node and before backtracking, it visits all other branches in a similar fashion. The fourth way to traverse a data structure employs a breadth-first search traversal, which also starts from the root note and visits all nodes of current depth before moving to the next depth in the data structure. A data structure is traversed to search or locate a given value or key in the data structure or print all its contents.

The in-order traversal method visits the leftmost segment of the structure, then the root node, and later the right-most segment. When a data structure is traversed in order, the output will produce sorted key values in ascending order. Using FIG. 3 as an example, the in-order traversal starts at A, then moves to B, traversed in-order. The process proceeds until all of the nodes are visited. The output of the in-order traversal of this data structure is D, B, E, A, F, C, and G.

Next, in the pre-order traversal, the root node is visited first, then the leftmost segment of the data structure, followed by the right-most segment. Using FIG. 3 as an example, the pre-order traversal, A itself is visited first, then moves on to B, which is also traversed pre-order. The process goes on until all the nodes are visited. This data structure's output of pre-order traversal is A, B, D, E, C, F, and G.

Next, in the post-order traversal, the root node is visited last. The left-most segment is visited first, then the right-most segment, followed by the root node. Using FIG. 3 as an example of the post-order traversal, A is the starting point, followed by first visiting B, which is traversed post-order. The process goes on until all the nodes are visited. The output of the post-order traversal of this data structure is D, E, B, F, G, C, and A.

Finally, in a level-order traversal, the breadth of the data structure takes priority first and then moves to depth. All the nodes present at the same level one-by-one from left to right will be visited then moved to the next level to visit all the nodes of that level. Using FIG. 3 as an example of the level-order traversal, A is the starting point, followed by first visiting B, then C. The process goes on until all the nodes are visited. The output of the post-order traversal of this data structure is A, B, C, D, E, F, and G.

Another alternative for the data structure traversal employs the Directed Acyclic Graph (DAG) approach. The DAG uses topological ordering that flows in one direction and where nodes do not refer back to themselves. The nodes are ordered so that the starting node has a lower value than the ending node. If it has a directed path containing all the nodes, then the ordering is the same as the order in which the nodes appear in the path, and the DAG has a unique topological ordering. For example, a node can be directly connected to the next consecutive level node and the next-next consecutive level node, such that the pointers have pointers for the next level only having knowledge of the next level pointer.

A time and a space complexity of the data structure play a pivotal part while working with large volumes of data. Linked lists, when compared to arrays, perform better at insert and delete operations and manage space efficiently; however, operations such as update, search, and traversal still take a time complexity of O(n), where n is the number of elements. Data structures such as binary search trees, AVL trees, and hash maps are superior to linked lists in terms of time complexity.

Figure 4:
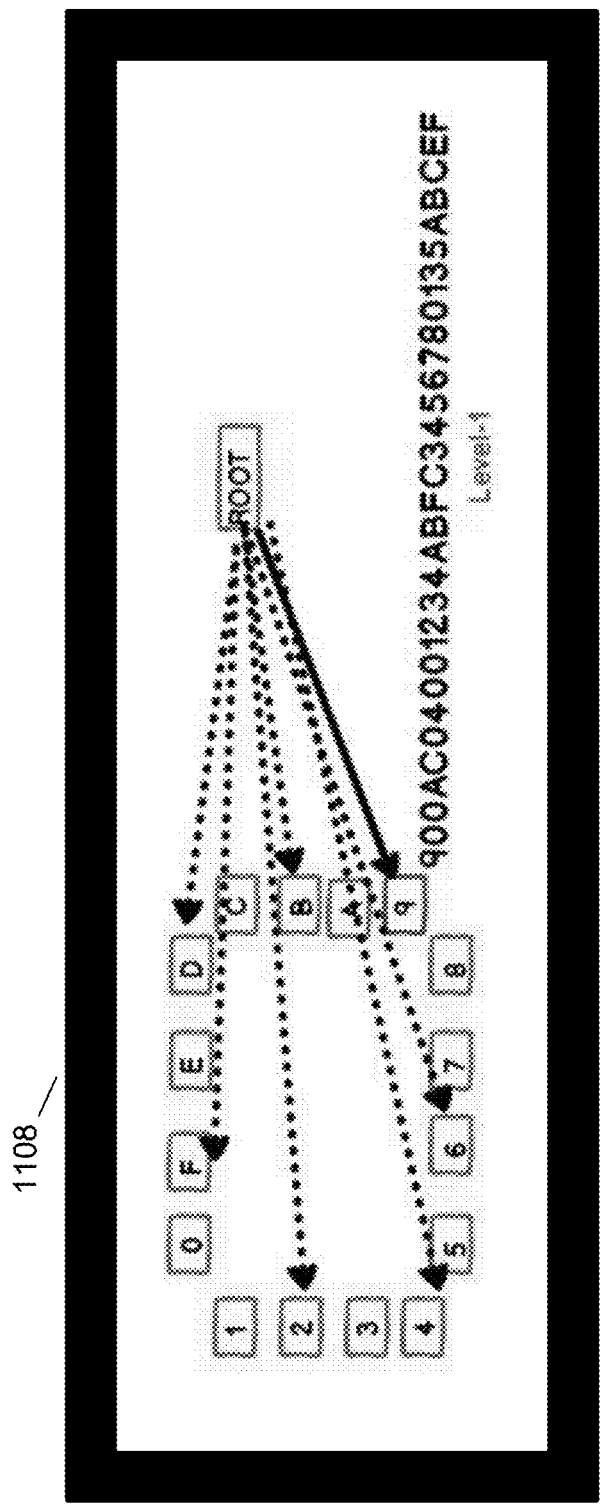
FIG. 4 shows sequentially a data structure stored within a system memory of the server device of FIG. 1, including a key, root node, data node, and router node.

FIGS. 4-7 schematically show sequential aspects of a data structure in a system memory 1108. FIG. 4 shows a data structure with a key of "900AC04001234ABFC3456780135ABCEF" exists. FIG. 4 depicts a node checking if the router node already exists. If no router node exists, then the node becomes a data node, as shown in the red "9" box. If the same key (900AC04001234ABFC3456780135ABCEF) is searched, then the constant run time is O(1).

Figure 5:
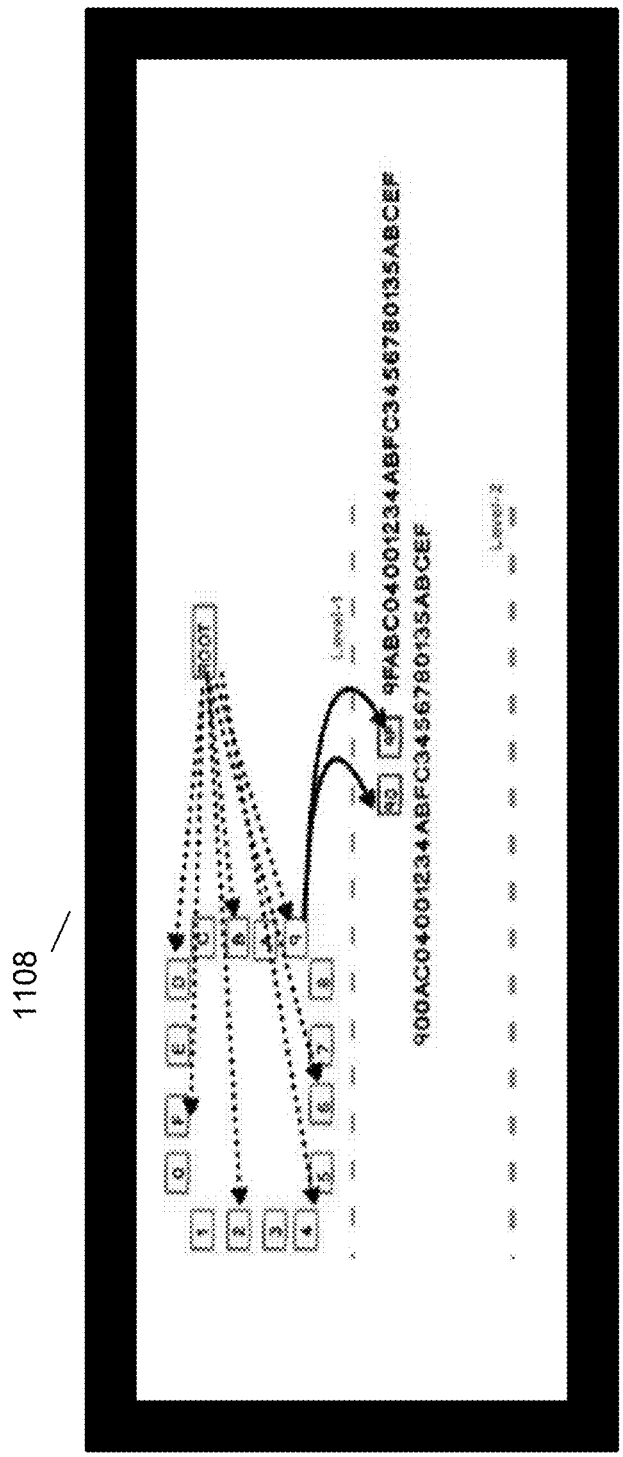
FIG. 5 shows sequentially a data structure stored within a system memory of the server device of FIG. 1, including multiple levels for additional router and data nodes.

If a different key is inserted that also begins with a "9" (e.g., 9FABC04001234ABFC3456780135ABCEF), then "9" will become the router node in Level-1, and the data nodes will be pushed one level down into Level-2, as shown in FIG. 5.

Figure 6:
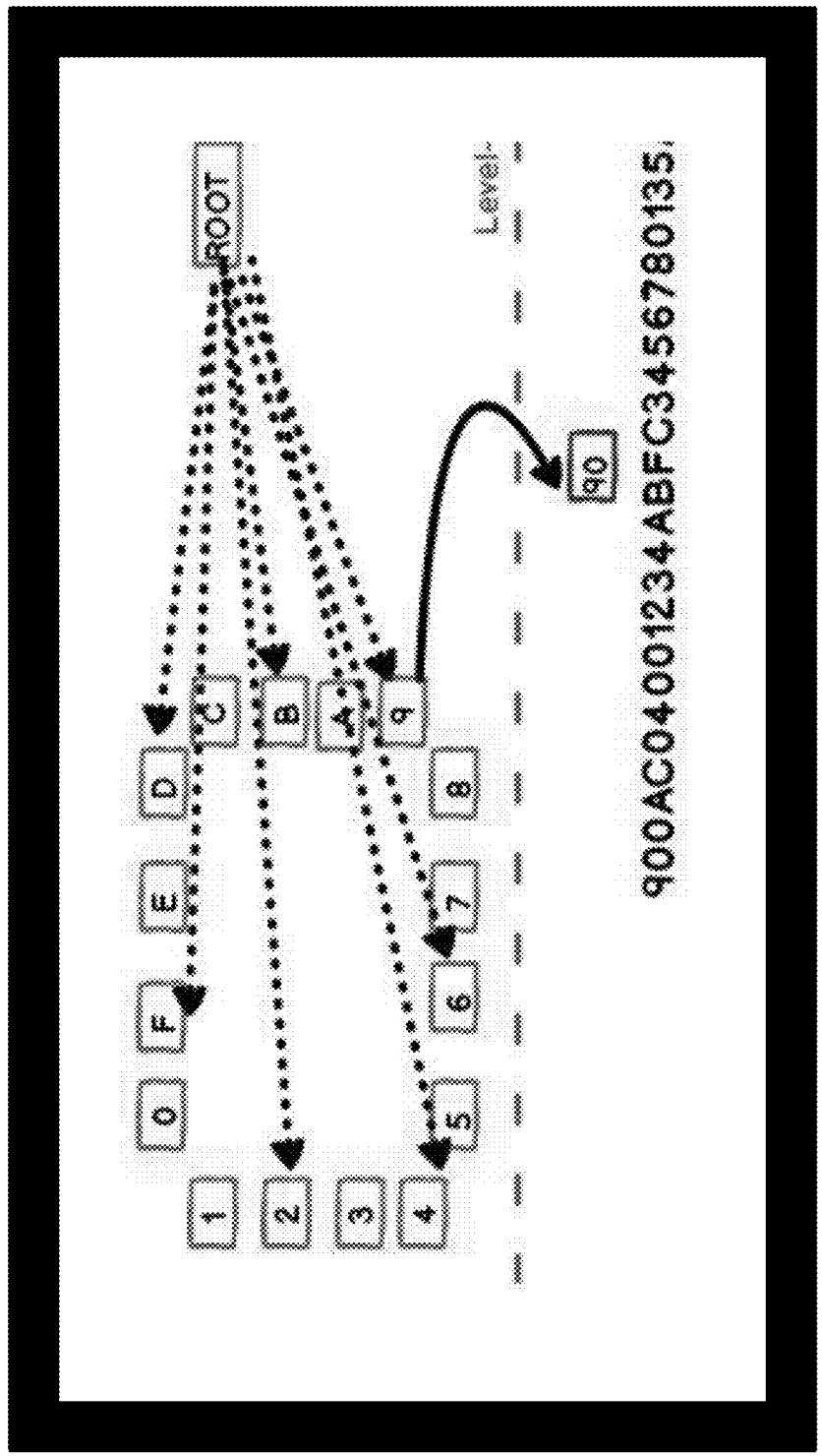
FIG. 6 shows sequentially a data structure stored within a system memory of the server device of FIG. 1, including the structure shrinking from the deletion of a data node.
Figure 7:
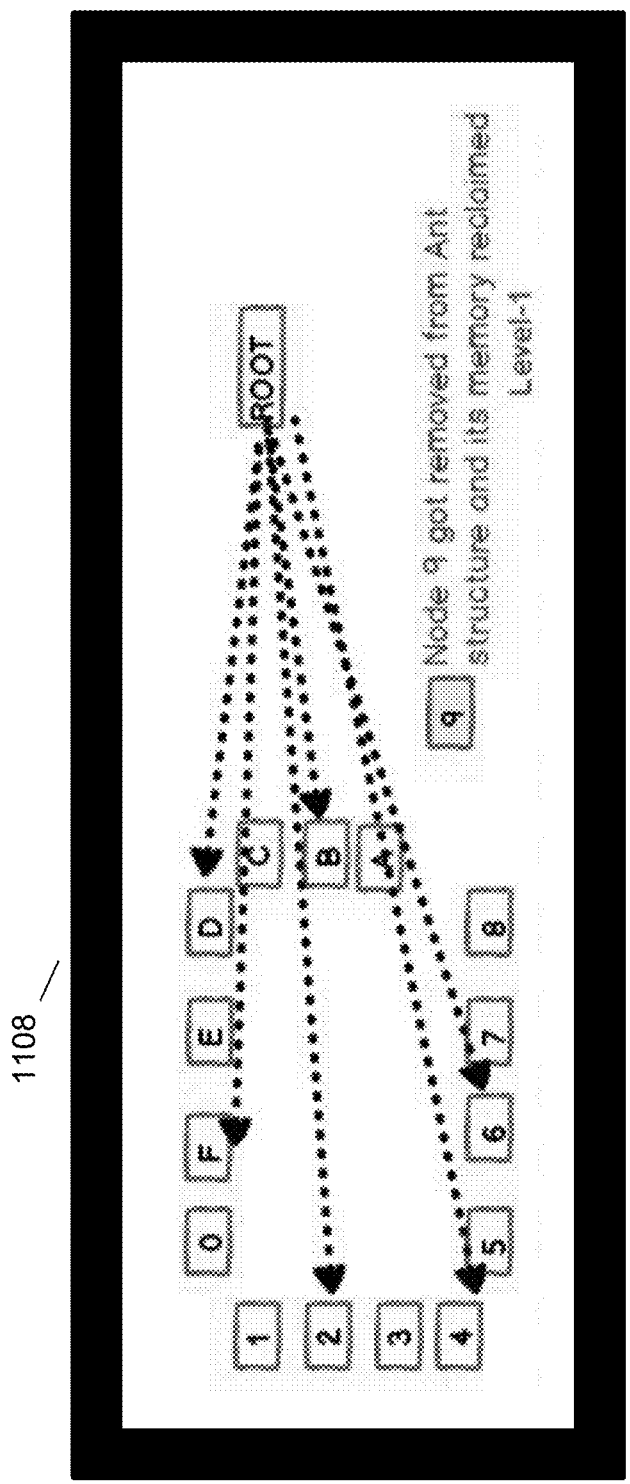
FIG. 7 shows sequentially a data structure stored within a system memory of the server device of FIG. 1, including the structure shrinking where the earlier inserted key was deleted.

Similarly, when the above data nodes are deleted, the data structure will shrink, as shown in FIGS. 6 and 7, where the earlier inserted keys were deleted.

As shown in FIG. 7, when all data nodes are removed under a router node, every reference under the router node was removed and recalled. In FIG. 7, the router node "9" was removed along with all the references under "9".

Every router node will have reference to a maximum of 16 nodes that are either router nodes or data nodes. The traversal from router node to router node by looking at the most significant digit and getting to the data node would occur in constant time. The worst-case time complexity for insert/update/search/delete would be O(32).

On the other hand, space complexity would be:

$$O(N) + \sum_{i=0}^{n} P^i$$

$$O(N) + \frac{P^{n+1} - 1}{P - 1},$$

Where "n" is the max level of the data structure, "p" is 16, and O(N) is the total number of data nodes. The number of router nodes will only store the reference to the other router and data nodes. For example, a search algorithm traverses six levels to find the data node located at the 7$^{th}$ level. A fully populated data structure at the 7$^{th}$ level will hold 16$^7$=268435456 or 268+ million data objects, which would require $$\frac{16^{7+1} - 1}{16 - 1} = 286331153$$

or 286+million reference objects.

To further illustrate, assume one data object takes 12 bytes of space and one reference takes 4 bytes of space. Thus, to store approximately 268 million data objects, roughly 3 GB of space would be required. Similarly, 286 million references would require approximately 1 GB of space. Thus, the space complexity will be 4 GB in total. The space utilization by a router or data node is merely used to illustrate space complexity and may vary in implementation.

Figure 8:
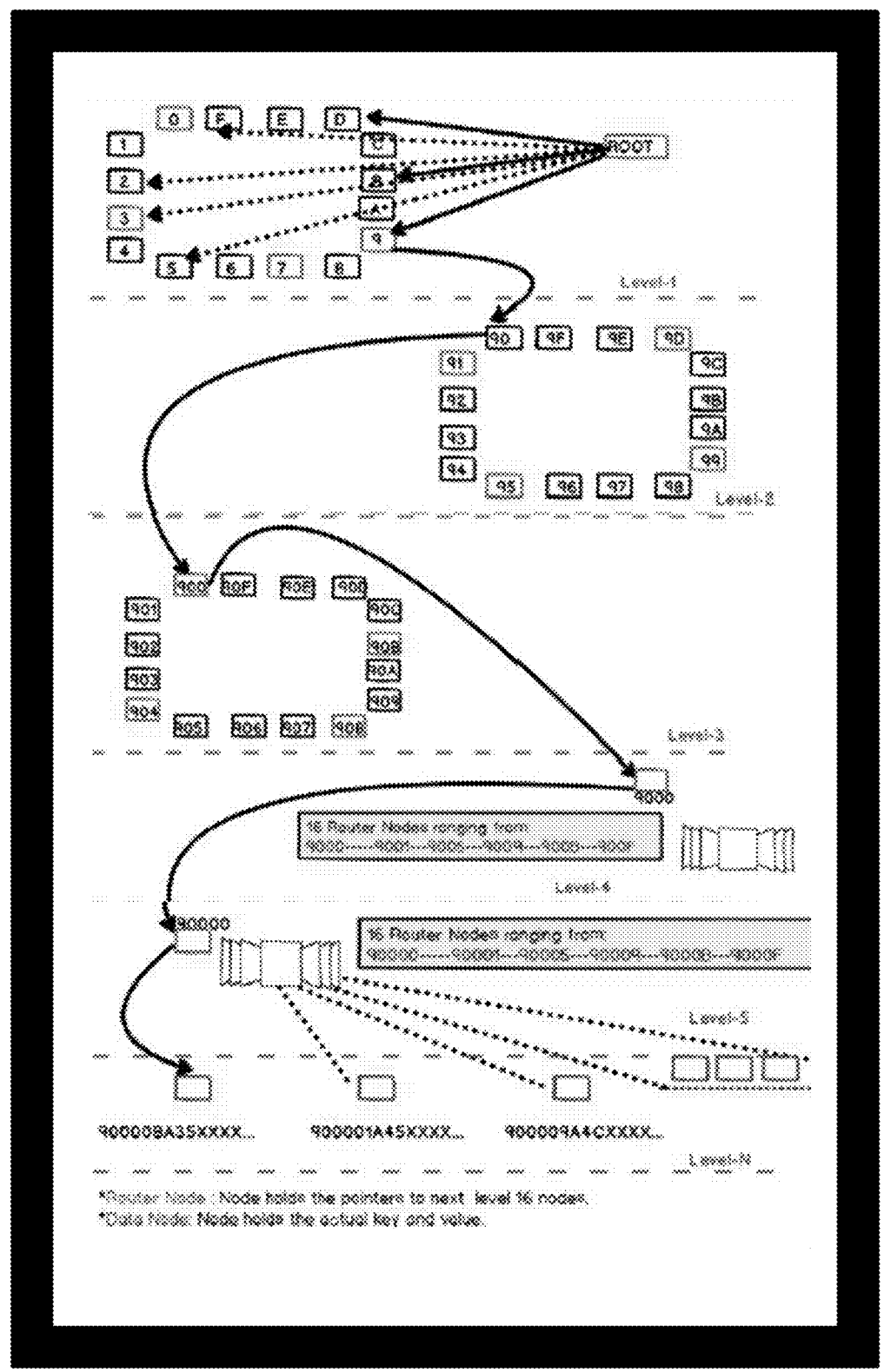
FIG. 8 shows a data structure stored within a system memory of the server device of FIG. 1, traversed from level to level.

FIG. 8 schematically shows aspects of a data structure within a system memory 1108 traversing from level to level. FIG. 8 illustrates a traversal from level to level of a data structure routing to find any key that starts with the hexadecimal digit "9" and comparing the next hexadecimal digit in the sequence.

FIGS. 9A-9G show exemplary data structure operational algorithms in pseudo-code form. FIG. 9A depicts instructions for inserting a node into a data structure. First, procedure insert is implemented with the parameters key and value. Within the procedure, the variable hex is set to the function of generate_hex with the parameter of the key passed. The generate_hex function generates a hexadecimal digit based on the key. Next, the variable node is set to the function of route_node with the hex value and parent node passed. The route node function will properly place the hex value within the data structure based on the consideration of the relevant parent node. Node.value is set to the value inside of the now properly placed data node. Finally, the insert procedure ends.

FIG. 9B depicts instructions for generating a hexadecimal digit resulting in an output of a 32 hexadecimal digit needed to build the data structure. First, the procedure to implement the function generate_hex with a key passed through is initiated and generates a string value. Generate_hex is used as part of the insert function, as discussed in the description of FIG. 9A. Next, the procedure begins with a variable called B_Num[ ] being set to a function to convert the key into a binary format of 128 bits, the index is set to four, hex_string is set to an empty string as " ", and a function to loop through b_num is initiated. Within the looping through b_num, variable f_grp is set to group every four bits, variable hex is set to a convert_to_hex with f_grp passed in as a parameter, and the hex_string is set to hex_string plus the hex variable declared above, and the index is set to index plus four. The loop is set to end and return the hex_string generated from the loop function. Finally, the generate_hex procedure ends.

FIG. 9C shows instructions for routing a node to its proper position inside the data structure. First, the procedure to implement the function route_node with a hex value and parent_node pass through it. Route_node is used as part of the insert function, as discussed in the description of FIG. 9A. Next, the procedure begins with a hex_digit being set to split the hex variable, the variable index is set to zero, the variable curr_node is set to equal the parent_node parameter passed in through the route_node procedure, and the variable prev_node is also set to the parent_node parameter, and a function to loop through the index less than the hex_digit_length is initiated. Within the looping through the index less than the hex_digit_length, prev_node is set to the curr_node, curr_node is set to the prev_node with the hex_digit variable passed through with the index as the hex_digit parameter. Next, a conditional statement is declared as if the curr_node is equal null, then another if statement is declared of is_expandable with prev_node, and join with hex_digit, index, and length, passed in as parameters, followed by curr_node being set to equal the function of expand with the parameters of prev_node, join with hex_digit, index, and length, passed in. If the is_expandable function does not apply, then the else condition is implemented. The curr_node is set to the function create_node, which passes the parameters prev_node, join with hex_digit, index, length passed in. Of either the if or else statement, the curr_node value is returned, the if statements are ended, followed by the increment index being incremented. The looping function ends, and the route-node procedure ends.

FIG. 9D depicts instructions for finding a node and/or value from within the data structure. First, the procedure to implement the function find_node with a key and parent_node passed through it. Next, the procedure begins with a variable hex_digit set to generate_hex with the key parameter passed in, the hex_digit being set to split the hex variable, the variable index is set to zero, the variable curr_node is set to equal the parent_node parameter, and a function to loop through the index less than the hex_digit_length is initiated. Within the looping through the index less than the hex_digit_length, curr_node is set to curr_node with hex_digit with index passed through it as parameters. Next, within the loop, a condition statement is declared as if the curr_node is equal to null, then a variable hex is set to join the hex_digit from index to hex_digit.length, curr_node is set to curr_node with hex passed as a parameter, and another if statement is declared as if curr_node is equal to null, null is returned and the if statement ends. Next, the outer nested if statement is ended and the index is incremented, followed by the loop ending and the curr_node variable being returned. Finally, the find_node procedure ends.

FIG. 9E shows instructions for deleting a node from a data structure. First, the procedure to implement the function delete_node with a key parameter passed through it. Next, the procedure begins with a variable node being set to find_node with the parameters key and root_node passed through it. The find_value node is the same procedure as described above in FIG. 9D. Next, an if statement is declared as if the node variable is not equal to null, the variable parent_node is set to node.parent, node.delete occurs, and the function collapse is implemented with parent_node passed as a parameter, followed by the if statement ending. Finally, the delete_node procedure ends. FIG. 9F depicts instructions for expanding nodes whenever necessary while inserting data into the data structure. First, the procedure to implement the function expand with curr_node, and new_hex_digit is passed through. Next, the procedure begins with a function to loop the curr_node.nodes as child_node, variable first_digit being declared as the child_node.hex_digit at index zero, variable child_digit being set as child_node.hex.digit.substr with one and length passed as parameters. Next, within the loop, a condition statement is declared as if first_digit is equal to new_hex_digit, child_node.hex_digit is set to first_digit, variable new_node is set to the function create_node with the parameters child_node and child digit passed through, child_node with parameter child_digit is set to new node, new_node.value is set to child_node.value, followed by the if statement and looping function ending. The curr_node by the new_hex_digit parameter is returned. Finally, the expand procedure ends.

Figure 10:
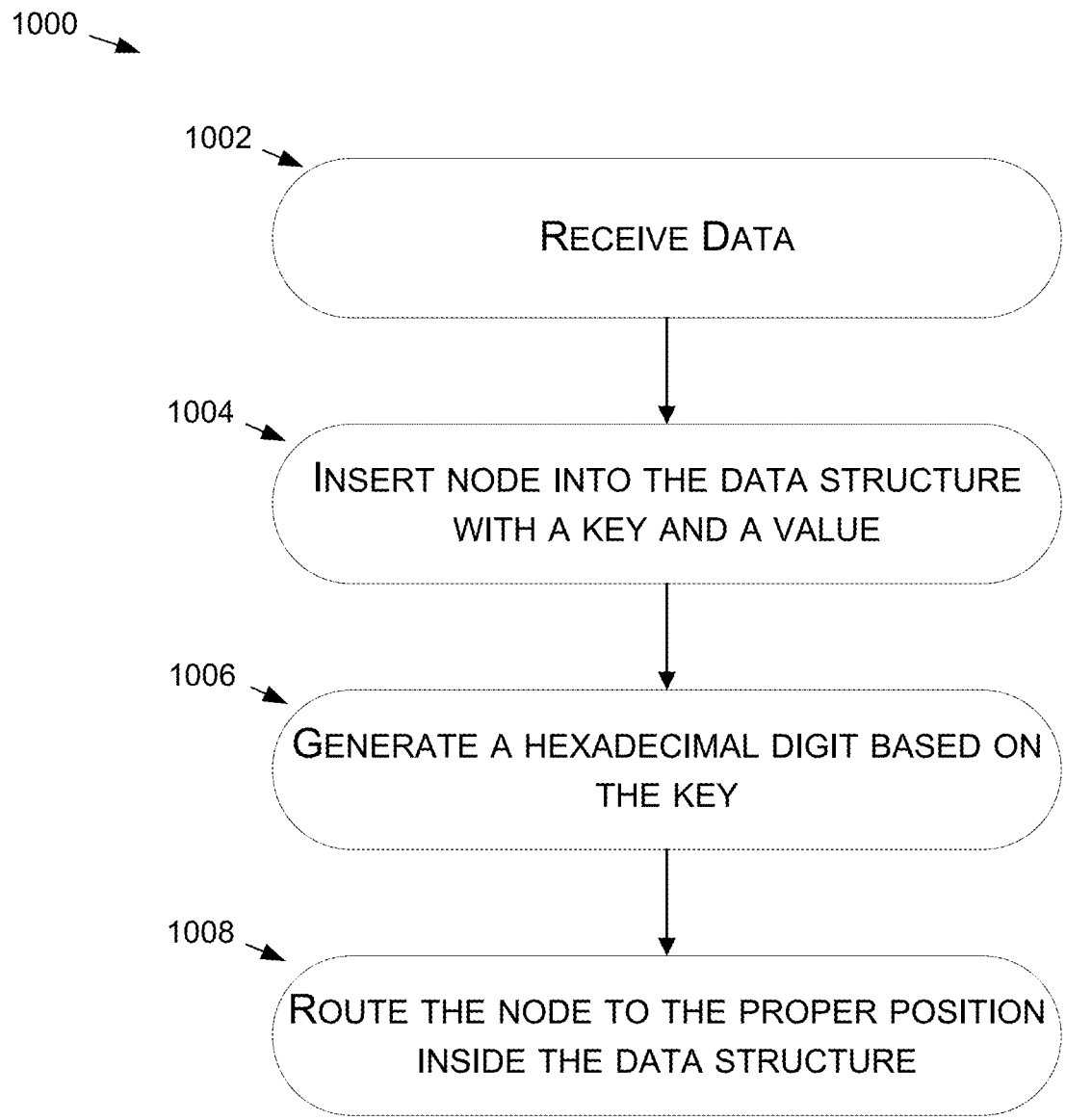
FIG. 10 shows an example method of the insertion flow.

FIG. 9G illustrates instructions for collapsing nodes whenever necessary while deleting data from the data structure. First, the procedure to implement the function collapse with the parameter node is passed through. Next, the procedure begins with an if statement declared, as if the node.childnodes.length is greater than 1, return and end the conditional if statement. Next, variable curr_node is set to node, variable parent_node is set to node.parent, followed by a function to loop the parent_node not equal to null. Within the looping procedure, an if statement is declared as if curr_node.childnodes.length is greater than 1, continue. If the if statement is not applicable, then the else statement is implemented as if curr_node.childnodes.length is equal to 1, parent_node.hex_digit is set to parent_node.hex_digit plus curr_node.hex_digit, parent_node.value is set to curr_node.value, and curr_node.delete occurs. If that if statement is not applicable, another else statement exists as else if curr_node.childnodes.length is equal to zero, curr_node.delete is implemented, and the conditional if else statement ends. Next, curr_node is set to parent_node, parent_node is set to parent_node.parent, followed by the looping function ending. Finally, the collapse procedure ends. FIG. 10 shows an example method 1000 for inserting into a data structure achieved in a worst-case complexity with a limited number of traversals.

At step 1002, the data to be stored in the data structure is received. This can be accomplished in various ways, such as through the client devices described here.

Next, at operation 1004, a node is inserted into the data structure as a key or value. For the key to be stored, the key needs to be represented in 128-bit binary form.

Next, at operation 1006, a hexadecimal digit is generated based on the key. The combination of every four bits represented must be in a hexadecimal digit. As a result of the 128-bit binary form and every four bits being represented being in hexadecimal format, there is a total of 32 hexadecimal digits, for example "900AC04001234ABFC3456780134ABCEF". See FIG. 4.

Finally, at operation 1008, the node is routed to a proper position inside the data structure at various routing levels, where the levels routed to are limited by either matching digit by digit or searching for the most significant digit to navigate through the router nodes and finally reach a data node to store the value. There can be a max of 32 levels, considering 31 routing levels and 1 data node level, which at maximum, the search path will travel 32 times or constant time O(32) in a worst case to find any given key.

As discussed, the time taken to find any given key from a fully populated data structure will be O(32). The fully populated data structure can hold up to $16^{32}$=340282366920938463463374607431768211456 unique pairs. The data structure can utilize memory from single or multiple machines spread across a cluster of computers or on a cloud computing platform.

Further, the nodes are flexible in that they can expand and collapse based on back pressure. Generally, nodes can the form of either router nodes or data nodes. Based on insert or delete operations, nodes at specific levels can expand or collapse. See FIGS. 4-7.

Figure 11:
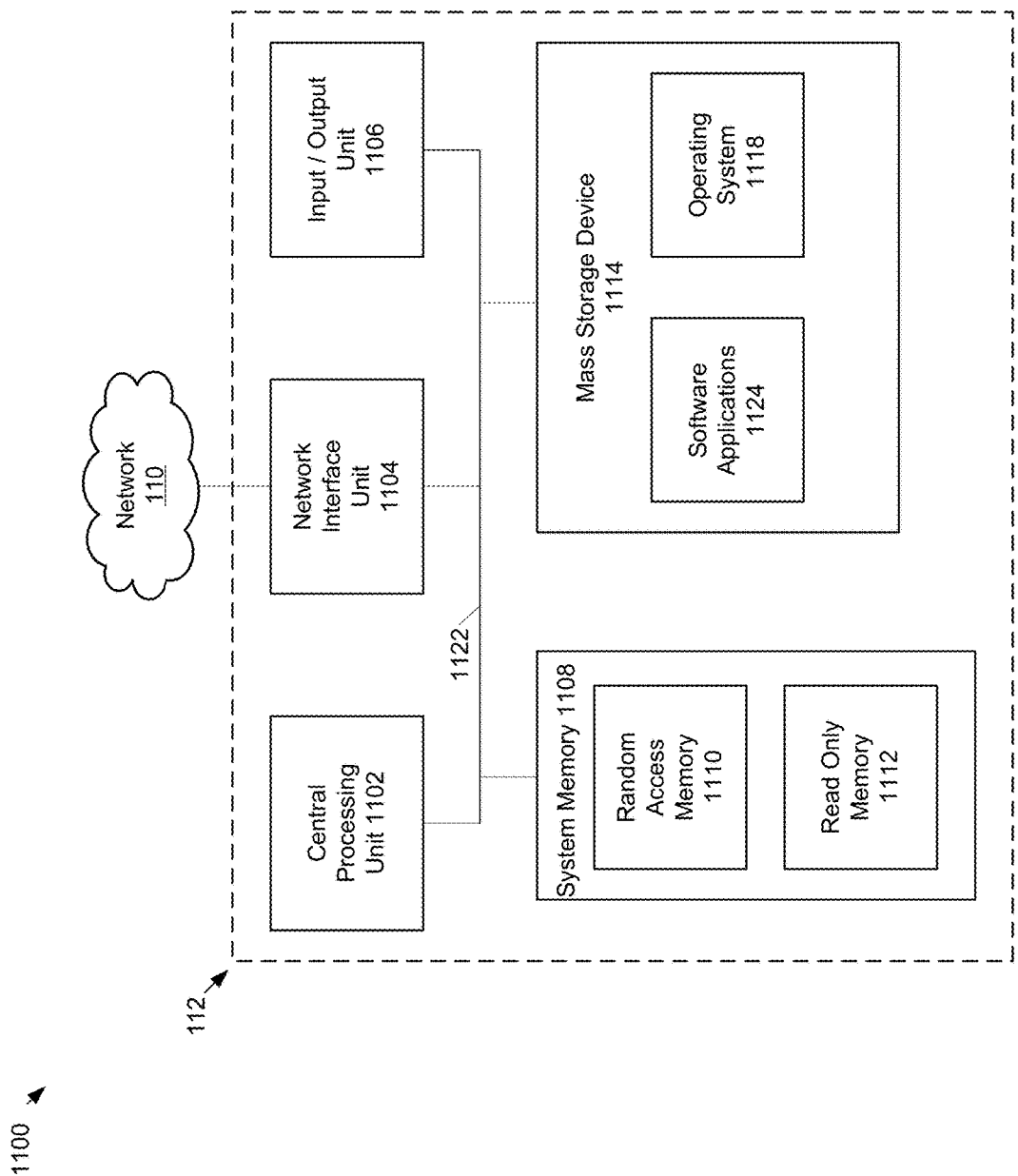
FIG. 11 shows example physical components of the server device of FIG. 2.

As illustrated in the example of FIG. 11, server device 112 includes at least one central processing unit ("CPU") 1102, a system memory 1108, and a system bus 1122 that couples the system memory 1108 to the CPU 1102. The system memory 1108 includes a random access memory ("RAM") 1110 and a read-only memory ("ROM") 1112. A basic input/output system containing the basic routines that help transfer information between elements within the server device 112, such as during startup, is stored in the ROM 1112. The server device 112 further includes a mass storage device 1114. The mass storage device 1014 can store software instructions and data. A central processing unit, system memory, and mass storage device similar to that in FIG. 11 are also included in other computing devices disclosed herein (e.g., devices 102, 104, 106).

The mass storage device 1114 is connected to the CPU 1102 through a mass storage controller (not shown) connected to the system bus 1122. The mass storage device 1114 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 1104 connected to the system bus 1122. It should be appreciated that the network interface unit 1104 may also be utilized to connect to other types of networks and remote computing systems. The server device 112 also includes an input/output controller 1106 for receiving and processing input from a number of other devices, including a touch user interface display screen or another type of input device. Similarly, the input/output controller 1106 may provide output to a touch user interface display screen or other output devices.

As mentioned briefly above, the mass storage device 1114 and the RAM 1110 of the server device 112 can store software instructions and data. The software instructions include an operating system 1118 suitable for controlling the operation of the server device 112. The mass storage device 1114 and/or the RAM 1110 also store software instructions and applications 1124, that when executed by the CPU 1102, cause the server device 112 to provide the functionality of the server device 112 discussed in this document. For example, the mass storage device 1114 and/or the RAM 1110 can store the building module 202, the revision module 204, and the traversing module 206.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system capable of traversing a data structure having at least two levels of pointers, comprising:
   one or more processors; and
   non-transitory computer-readable storage media encoding instructions which, when executed by the one or more processors, causes the computer system to:
      receive a plurality of data that is contained in the data structure to be traversed;
      generate a hexadecimal digit based on a key;
      in response to a deletion within the data structure, route a node to a proper position inside the data structure at various routing levels by traversing the various levels of the data structure in order of most significant digits of the key to least significant digits, wherein the routing levels are limited; and
      insert the node into the data structure with the key and a value.

2. The computer system of claim 1, wherein a search is limited to less than 32 traversals.

3. The computer system of claim 1, wherein the node includes a root node which enters different various levels, a router node which does not hold data, or data node which stores the value.

4. The computer system of claim 1, wherein the node is searched for within the data structure.

5. The computer system of claim 1, wherein nodes expand while inserting data into the data structure by allocating blocks of memory as required, and linking those blocks.

6. The computer system of claim 1, wherein nodes collapse while deleting data from the data structure deallocating blocks of memory as required, and the memory is reclaimed.

7. The computer system of claim 6, wherein traversal operations achieve a worse case time complexity of at least less than constant time.

8. The computer system of claim 1, wherein the data structure is implemented in data mining processes.

9. The computer system of claim 1, further comprising instructions which, when executed by the one or more processors, causes the computer system to remove a router node reference and memory is reclaimed when a data node is removed under the router node reference.

10. The computer system of claim 1, wherein nodes expand and collapse based on back pressure to ensure that the computer system is resilient under load.

11. A computer-implemented method capable of traversing a data structure having at least two levels of pointers, comprising:
    receiving a plurality of data that are contained in the data structure to be traversed;
    generating a hexadecimal digit based on a key;
    in response to a deletion within the data structure, routing a node to a proper position inside the data structure at various routing levels by traversing the various levels of the data structure in order of most significant digits of the key to least significant digits, wherein the routing levels are limited; and
    inserting the node into the data structure with the key and a value.

12. The method of claim 11, wherein the key is represented in 128 bit binary form.

13. The method of claim 11, wherein the routing levels are less than 32.

14. The method of claim 13, wherein the routing levels are less than 31 routing levels and 1 data node level.

15. The method of claim 11, wherein, when no router node is located, the node becomes a data node.

16. The method of claim 11, wherein the data structure is limited to less than $16^{32}$ unique key value pairs.

17. The method of claim 11, wherein the data structure can utilize memory from one or more machines.

18. The method of claim 17, wherein the memory is utilized from a cloud service.

19. A system for finding a key in a multi-level data structure, comprising:
    one or more processors; and
    non-transitory computer-readable storage encoding instructions which, when executed by the one or more processors, causes the system to:
       generate a hexadecimal digit based on the key;
       in response to a deletion within the multi-level data structure, route a node to a proper position inside the multi-level data structure at various routing levels by traversing the various levels of the data structure in order of most significant digits of the key to least significant digits, wherein the routing levels are limited; and
       insert the node into the multi-level data structure with the key and a value.

20. The system of claim 19, wherein nodes are expandable and collapsible.

* * * * *